United States Patent
Yokota

[11] Patent Number: 5,260,010
[45] Date of Patent: * Nov. 9, 1993

[54] METHOD OF DETECTING FILLING WEIGHT FOR INJECTION MOLDER

[75] Inventor: Akira Yokota, Osaka, Japan

[73] Assignee: Komatsu Ltd., Tokyo, Japan

[*] Notice: The portion of the term of this patent subsequent to Nov. 2, 2010 has been disclaimed.

[21] Appl. No.: 773,637
[22] PCT Filed: Mar. 13, 1991
[86] PCT No.: PCT/JP91/00337
§ 371 Date: Nov. 13, 1991
§ 102(e) Date: Nov. 13, 1991
[87] PCT Pub. No.: WO91/13745
PCT Pub. Date: Sep. 19, 1991

[30] Foreign Application Priority Data
Mar. 14, 1990 [JP] Japan .................................. 2-64563

[51] Int. Cl.$^5$ ............................................. B29C 45/76
[52] U.S. Cl. .................... 264/40.4; 264/40.5; 425/145; 425/148
[58] Field of Search .................... 264/40.1, 40.4, 40.5, 264/328.1; 425/135, 145, 146, 147, 149, 150, 148

[56] References Cited
U.S. PATENT DOCUMENTS
| | | | |
|---|---|---|---|
| 3,750,134 | 7/1973 | Weisend | 425/145 |
| 3,767,339 | 10/1973 | Hunkar | 425/145 |
| 4,816,197 | 3/1989 | Nunn | 425/140 |
| 5,057,255 | 10/1991 | Sato et al. | 425/145 |

FOREIGN PATENT DOCUMENTS
| | | |
|---|---|---|
| 62-184825 | 8/1987 | Japan . |
| 63-150632 | 6/1988 | Japan . |

*Primary Examiner*—Jill L. Heitbrink
*Attorney, Agent, or Firm*—Armstrong, Teasdale, Schlafly & Davis

[57] ABSTRACT

A method of detecting the filling weight for an injection molder, or specifically to a method of detecting the weight of the plasticized synthetic resin injected from the injection molder cylinder to fill the cavity of a mold. The object is to ensure highly accurate detection of the filling weight on the injection molder side, in continuous molding production. The weight of the resin injected from the cylinder to fill in the cavity is detected through operations on the basis of the positional values of the screw and the pressure and temperature valves of the resin obtained before and after injection, with the resin pressure maintained at a specified value and with the block valve and check valve closed.

4 Claims, 4 Drawing Sheets

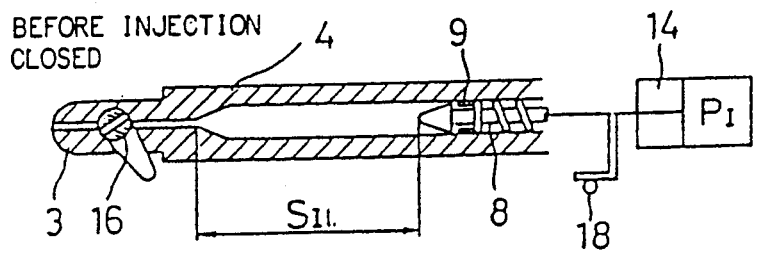
FIG. 2A
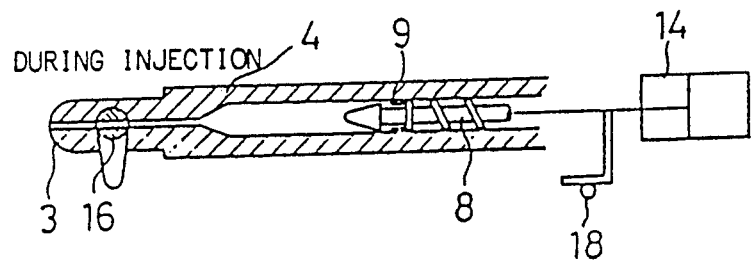
FIG. 2B
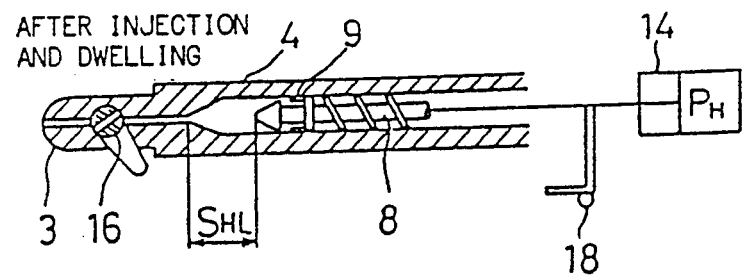
FIG. 2C
FIG. 2

METHOD OF DETECTING FILLING WEIGHT FOR INJECTION MOLDER

FIELD OF THE INVENTION

The present invention relates to a method of detecting the weight of plasticized synthetic resin injected from the cylinder of an injection molder to fill in the cavity of a mold.

BACKGROUND OF THE INVENTION

In continuous production of desired moldings by injecting plasticized synthetic resin from the cylinder of an injection molder through the nozzle to fill in the cavity of a mold connected to the nozzle, it is essential to inject the resin by accurate amount in term of weight corresponding to the capacity of the cavity or the volume of the intended product. If the filling weight is greater than the required value, excess resin is forced out through the parting line of the mold to form flash. Inversely, if the filling weight is smaller than the required value, recesses are formed on the molded surface, resulting in a defective product with sinks.

Conventionally, for continuous production of moldings of a constant quality, it is known that the weight of plasticized synthetic resin injected from an injection molder to fill in a mold cavity is detected on the basis of a position of a screw in the injection molder. The followings are the methods:

i) The filling weight is detected on the basis of the screw position in the injection molder before resin injection into the mold cavity.

ii) The filling weight is detected on the basis of either of the following screw positions upon completion of dwelling following the resin injection into the mold cavity:
  (1) The position of the screw at the forward limit for dwelling.
  (2) The position of the screw relieved from the dwelling pressure after dwelling.

iii) The filling weight is detected on the basis of the difference between the screw position before resin injection into the mold cavity and that after dwelling following the injection.

In any of these conventional methods, however, the filling weight can be detected with a limited accuracy and so forth because of the following reasons:

Method of i)

The pressure of plasticized synthetic resin in the injection molder cylinder is not controlled nor monitored until immediately before resin injection through the nozzle of the molder. Therefore, the pressure of the plasticized synthetic resin does not become constant in the case of the plasticized synthetic resin having compressibility. Particularly where the screw of the injection molder is retreated forcedly for reducing the resin pressure in the cylinder so as to prevent the resin from leaking through the injection molder nozzle, the resin pressure fluctuates due to air drawn through the nozzle end.

The check valve provided at the front end of the screw is open before injection because no pressure is applied to the screw. When the check valve is closed under pressure applied to the screw for injection, small amount of resin flows back in the cylinder. This also results in the poor detection accuracy of this method.

Method of ii)

For the case (1)

The dwelling pressure is varied to meet various molding conditions for different products. The compression amount of compressible plasticized synthetic resin varies depending on the dwelling pressure.

A high detection accuracy could be achieved by comparing the resin amount in the injection molder cylinder under a constant dwelling pressure. However, since the dwelling pressure is one of the essential molding conditions that determine the shape and dimensions of moldings, it is impracticable to maintain a constant dwelling pressure.

For the case (2)

After application of pressure to the screw for dwelling is stopped, it takes certain time for the plasticized synthetic resin in the injection molder cylinder to be relieved from the pressure. Since the time required for this purpose varies depending on the kind and temperature of the plasticized synthetic resin, it is difficult to know whether or not the resin has been relieved completely from pressure.

Although it takes certain time to remove a dwelling pressure from the plasticized synthetic resin, it is general to assign rather short time for this purpose to avoid reduction in the productivity in the actual molding operation.

Method of iii)

The difference in the screw position indicates the volume of injected resin. However, the resin volume changes with the resin temperature and/or the pressure applied to the screw, and is not proportional to the weight of the injected resin. Moreover, the resin temperature and the pressure applied to the screw are among variable molding conditions. So, the difference in the screw position is not a good measure for the weight of injected resin. Furthermore, in continuous molding, since the hydraulic oil temperature and ambient temperature change with time, it is difficult to maintain a constant resin temperature and/or constant pressure to be applied to the screw. Even if the resin volume fluctuation caused by change in these conditions is detected in term of the change in screw position, it is impossible to detect defective products, forecasting such change in the molding conditions; normal products would be rejected as defective products, thus decreasing the productivity.

To solve these problems, the object of the present invention is to provide a method of detecting the filling weight for an injection molder, which permits highly accurate detection, on the injection molder side, of the weight of plasticized synthetic resin injected from the injection molder to fill in a mold cavity.

DISCLOSURE OF THE INVENTION

In order to achieve the above object, according to the present invention, the weight of plasticized synthetic resin injected to fill in a mold cavity is detected by obtaining the positional values of the screw and the resin pressure values before injection and after injection and dwelling, under the conditions of A through C described below, and by calculating and operating the specific volume value for each of the above resin pressure values on the basis of the preliminarily obtained formula for relation between resin pressure and specific volume values.

A. The check valve at the front end of the screw is in the closed state when obtaining the positional value of the screw or the resin pressure value in the cylinder corresponding to the positional value.

B. The pressure of the plasticized synthetic resin is maintained at a specified value when obtaining the positional value of the screw or the resin pressure value in the cylinder corresponding to the positional value.

C. The pressure of the plasticized synthetic resin must not influence molded products when obtaining the positional value of the screw or the resin pressure value in the cylinder corresponding to the positional value.

Thus, according to the present invention, the method of detecting the weight of plasticized synthetic resin injected from the cylinder of an injection molder to fill in a mold cavity comprises the steps of:

(a) preliminarily obtaining the formula for relation between the pressure value and specific volume value of plasticized synthetic resin as a characteristic equation for the resin;

(b) providing, between the cylinder and the mold cavity, a flow path closing mechanism capable of blocking the flow of plasticized synthetic resin between the cylinder and the cavity;

(c) closing the flow path closing mechanism to block the resin flow before injecting the resin from the cylinder into the cavity;

(d) applying a specified pressure to the screw with the resin flow blocked so as to effect a balancing movement of the screw;

(e) obtaining the positional value of the screw at a first stop position at which the screw stops its balancing movement, and the resin pressure value determined by the pressure applied to the screw at the first stop position;

(f) opening the flow path closing mechanism to allow plasticized synthetic resin to flow through;

(g) applying pressure to the screw with the flow path closing mechanism open, to inject the resin into the mold cavity;

(h) closing the flow path closing mechanism to block the resin flow upon completion of injection and dwelling;

(i) applying a specified pressure to the screw with the resin flow blocked so as to effect another balancing movement of the screw;

(j) obtaining the positional value of the screw at a second stop position at which the screw stops its balancing movement, and the resin pressure value determined by the pressure applied to the screw at the second stop position; and (k) obtaining the weight of the plasticized synthetic resin injected to fill in the mold cavity, on the basis of the formula for relation between resin pressure value and specific volume value, as well as the positional values of the screw at the first and second stop positions and the resin pressure values determined by the pressures applied to the screw at the first and second stop positions.

To produce moldings of a constant quality, it is essential that the density of the plasticized synthetic resin filling the mold cavity be constant. The filling density $\rho$ is expressed by the following equation:

$$\rho = G'/V'$$

wherein
  G': filling weight
  V': inside capacity of cavity

Since the inside capacity of the cavity V' is fixed, the filling density $\rho$ of plasticized synthetic resin in the cavity is constant if the filling weight G' is constant. Since the filling weight G' of the plasticized synthetic resin in the mold cavity is equal to the injection weight G of the resin from the cylinder, it is enough to monitor the injection weight G in order to maintain a constant filling density $\rho$.

Meanwhile, the reciprocal of the filling density $\rho$ of plasticized synthetic resin is a specific volume value, which is expressed as a function of the pressure value when the temperature is fixed. So, if the formula for relation between pressure value (P) and specific volume value (V) of plasticized synthetic resin (hereinafter referred to as the PV relation formula) has been obtained in advance, it is possible to determine the injection weight G of the plasticized synthetic resin from the cylinder, or the filling weight G' of the plasticized synthetic resin in the mold cavity, using the equation (1) below, from the positional value of the screw at the first stop position (before injection), the resin pressure value in the cylinder with the screw at the first stop position, the positional value of the screw at the second stop position (after injection and dwelling), and the resin pressure value in the cylinder with the screw at the second stop position.

$$G(=G')=A\times\{S_I/V(P_{I1})-S_H/V(P_{H1})\} \qquad (1)$$

wherein
  A: inside cross sectional area of cylinder
  $S_I$: positional value of screw before injection
  $S_H$: positional value of screw after injection and dwelling
  $P_{I1}$: resin pressure value for $S_I$
  $P_{H1}$: resin pressure value for $S_H$
  $V(P_{I1})$: specific volume value for $S_I$ and $P_{I1}$
  $V(P_{H1})$: specific volume value for $S_H$ and $P_{H1}$ The positional value of the screw at the first stop position (before injection), the resin pressure value in the cylinder with the screw at the first stop position, the positional value of the screw at the second stop position (after injection and dwelling), and the resin pressure value in the cylinder with the screw at the second stop position are obtained in the following method:

A specified pressure is applied to the screw with the flow path closing mechanism between the injection molder cylinder and the mold cavity closed. Then, the check valve at the front end of the screw is closed or kept closed, and the screw compresses the plasticized synthetic resin in front of the screw, makes a balancing movement, and stops at a point where the pushing pressure equilibrates with the resilience of the plasticized synthetic resin to be compressed, namely at the first stop position. With the screw at the first stop position, the plasticized synthetic resin in front of the screw in the cylinder provides a specified resin pressure determined by the pushing pressure applied to the screw at the first stop position. The positional value of the cylinder corresponding to this positional value are obtained under this specified resin pressure.

When the flow path closing mechanism is opened, the screw is moved forward, so that the resin is injected into the mold cavity.

After the injection and subsequent dwelling are completed, the flow path closing mechanism is closed. With this state, when a specified pressure is applied to the screw, the check valve at the front end of the screw is closed or kept closed, and the screw compresses the plasticized synthetic resin in front of the screw, makes a balancing movement, and stops at a point where the pushing pressure equilibrates with the resilience of the plasticized synthetic resin to be compressed, namely at the second stop position. With the screw at this second stop position, the resin in front of the screw in the cylinder provides a specified resin pressure determined by the pressure applied to the screw at the second stop position. The positional value of the screw after injection and dwelling, and the resin pressure value in the cylinder corresponding to this second positional value are obtained under this specified resin pressure.

Finally, the specific volume value of the resin under each of these specified resin pressures is obtained by using the PV relation formula. The filling weight is then obtained through operation of the equation (1), on the basis of the thus obtained specific volume values and the positional values of the screw at the first and second stop positions.

According to the present invention, as mentioned above, a specified pressure is applied to the screw with the flow path closing mechanism in the closed state so that the check valve is closed or kept closed and that a specified resin pressure is generated in the plasticized synthetic resin. Under this condition, the injection or filling weight is obtained through operations on the basis of the positional values of the screw at the first and second stop positions, and the resin pressure values in the cylinder corresponding to the respective positional values. Accordingly, it is possible to detect the filling weight of the resin in the mold cavity at a high accuracy on the injection molder side in the continuous molding production process. In addition, according to the present invention, the flow path closing mechanism is closed when the specified resin pressures are generated to obtain the positional values of the screw at the first and second stop positions and the resin pressure values in the cylinder corresponding to the respective positional values. Therefore, the pressure applied to the screw does not influence finished products. In other words, the filling weight can be detected accurately regardless of the molding conditions.

In the method described above, the specific volume values are obtained from the PV relation formula for plasticized synthetic resin at a constant temperature. In the continuous production, however, the resin temperature can fluctuate as the ambient temperature changes with time. The resin temperature influences the specific volume values of the resin. It is preferable, therefore, to use the formula for relation among pressure value (P), specific volume value (V) and temperature (T) of plasticized synthetic resin (hereinafter referred to as the PVT relation formula) as a characteristic equation of the resin. In this case, the specific volume value for pressure $P_{I1}$ and temperature $T_{I1}$ is expressed as $V(P_{I1}, T_{I1})$, and that for $P_{H1}$ and $T_{H1}$ as $V(P_{H1}, T_{H1})$. Therefore, the injection weight G of the resin from the cylinder or the filling weight G' of the resin in the mold cavity is expressed by the following equation (1)':

$$G(=G')=A\times\{S_I/V(P_{I1}, T_{I1})-S_H/V(P_{H1}, T_{H1})\} \quad (1)'$$

The detection method of the present invention may be designed so that an abnormality signal is emitted if the filling weight thus obtained in the above method is out of the preset range. With such abnormality signal, it is possible to know whether or not the product has been molded properly.

BRIEF DESCRIPTION OF THE DRAWINGS

FIGS. 1 through 6 explain a preferred embodiment of the method of detecting the filling weight for an injection molder according to the present invention:

FIG. 1 is a schematic vertical section of an entire injection molder including a mold, FIGS. 2(A) through (C) show the states of the block valve and check valve with the screw at various positions, FIG. 3 is an explanatory drawing showing positional values of the screw, FIG. 4 is a graph explaining the method of converting the capacity of the cylinder space between the block valve and the front end of the screw at the forward limit to the positional value of the screw, FIG. 5 is a graph showing the relation between specific volume value and temperature of resin under a constant pressure, and FIG. 6 explains the method of obtaining the PVT relation formula.

PREFERRED EMBODIMENT OF THE INVENTION

An embodiment of a method of detecting the filling weight for an injection molder according to the present invention is described below with reference to the accompanying drawings.

Figure 1:
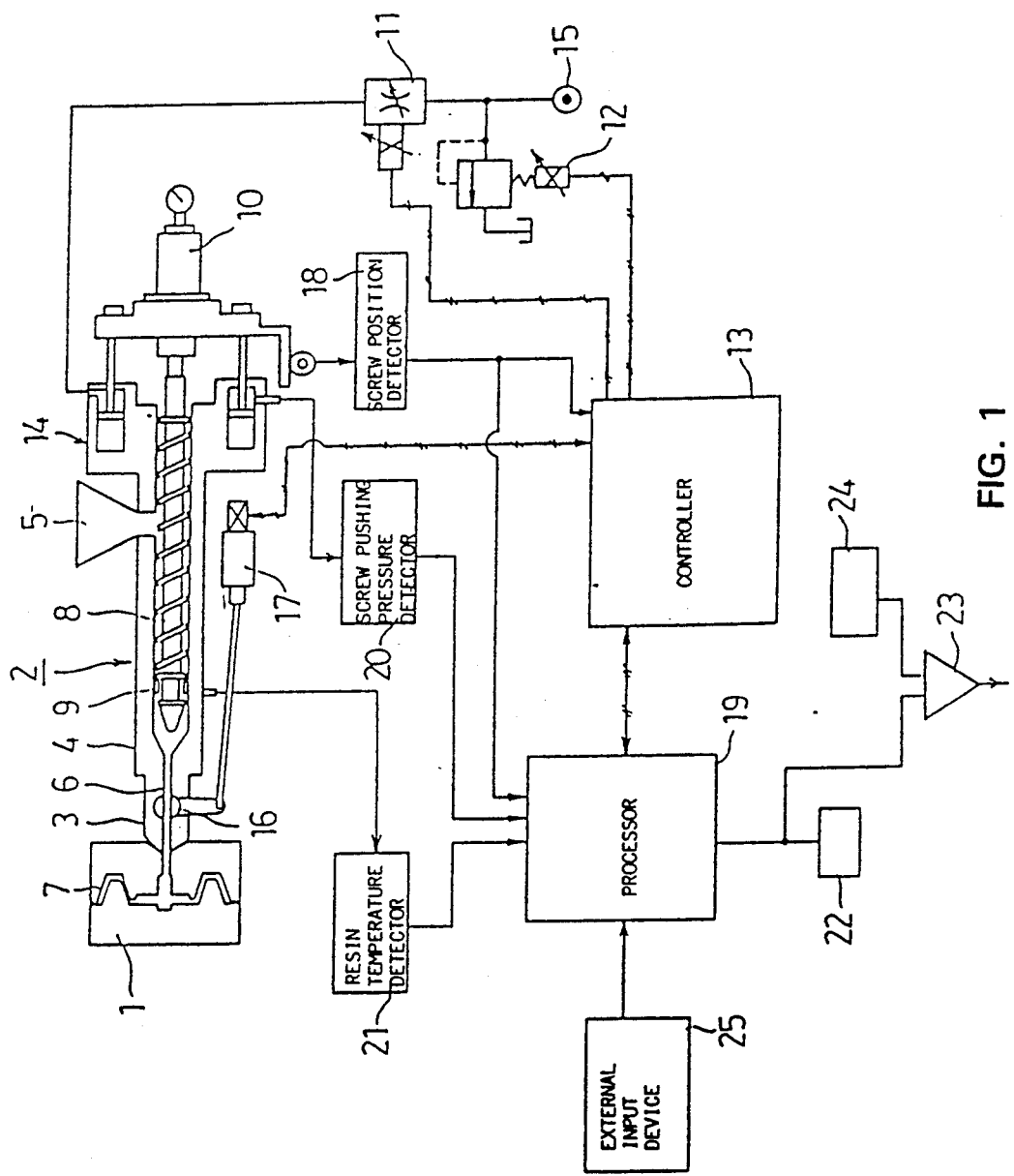

Referring to FIG. 1, an injection molder 2 is connected through a nozzle 3 with a mold 1 in which a product is to be injection-molded. The injection molder 2 has a cylinder 4 containing a screw 8. Synthetic resin pellets supplied through a hopper 5 are melted and kneaded by the screw 8 in the heated cylinder 4 while the molten resin is forced out by the screw 8 into the cavity 7 of the mold 1 through a flow path 6 formed in the nozzle 3. A check valve 9 is provided at the front end of the screw 8. The screw 8 is rotated by a screw-driving motor 10, for melting and kneading the synthetic resin pellets. The screw 8 is driven, under specified pressures applied by an injection piston 14, for reciprocating motion with respect to the nozzle 3 including balancing movements, thereby injecting the molten plasticized synthetic resin into the cavity 7 or the mold 1. The injection piston 14 is operated by means of oil pressure controlled by an electromagnetic flow valve 11 and an electromagnetic pressure valve 12 both of which are operated by a controller 13. 15 is a pressure oil source.

As the flow path closing mechanism of the present invention, a block valve 16 is provided in the flow path 6 of the nozzle 3 so as to block the flow of molten plasticized synthetic resin. The block valve 16 is operated by a driving unit 17 which is also controlled by the controller 13. Positional data of the screw 8 in the cylinder 4 is given from a screw position detector 18 to the controller 13.

On the basis of the positional data of the screw 8 given by the screw position detector 18, the controller 13 operates the electromagnetic flow valve 11, electromagnetic pressure valve 12 and driving unit 17 according to a specified program, thus driving the screw 8 for reciprocating motion with respect to the nozzle 3 including the balancing movement, applying specified pressures to the screw 8, and operating the block valve 16.

The screw position detector 18 also sends positional data of the screw 8 in the cylinder 4 to a processor 19. The processor 19 also receives pushing pressure data for the screw 8 from a screw pushing pressure detector 20, temperature data for the plasticized synthetic resin in the cylinder 4 from a resin temperature detector 21, and weight-related external data from an external input device 25. On the basis of these data, the processor 19 executes operations concerning the weight of the resin injected to fill in the cavity 7 of the mold 1, using the PV or PVT relation formula. The filling weight thus obtained is shown on a display 22, and compared by a comparator 23 with the normal filling weight range set in advance in a monitoring range setter 24. If the filling weight is out of the set range, the comparator 23 outputs an abnormality signal.

In the present embodiment, the PVT relation formula is used in detecting the filling weight of plasticized synthetic resin in the mold cavity 7. If the PVT relation formula is known, it is possible to obtain the filling weight in the method described below. Even if the PVT relation formula is not known, the filling weight can be obtained easily in the method described later, by using the injection molder 2 of the present invention.

In obtaining the filling weight of the plasticized synthetic resin in the cavity 7 of the mold 1, each part of the injection molder is operated as follows:

i) Before injection [FIG. 2(A)]

The block valve 16 is closed, and a specified pressure $P_I$ is applied through the injection piston 14 to the screw 8 with the block valve 16 closed. Under this pressure $P_I$, the screw 8 is moved forward to compress the plasticized synthetic resin in front of the screw 8, makes a balancing movement, and stops at a first stop position where the pressure $P_I$ equilibrates with the resilience of the compressed plasticized synthetic resin. The screw position detector 18 detects the positional value $S_I$ of the screw at the first stop position of the screw 8, and sends it to the controller 13 and the processor 19. The resin temperature detector 21 detects the resin temperature $T_{I1}$ of the plasticized synthetic resin with the screw 8 at the first stop position. Simultaneously, the screw pushing pressure detector 21 detects the pressure applied to the screw 8, or the resin pressure value $P_{I1}$ determined by the pressure applied to the screw at the first stop position. All these data are supplied to the processor 19.

ii) During injection [FIG. 2(B)]

The block valve 16 is opened, and the screw 8 is moved forward to inject the plasticized synthetic resin into the cavity 7 of the mold 1. The operation process of injecting the resin to fill in the mold cavity 7 is the same as that with a general injection molder.

iii) After injection and dwelling [FIG. 2(C)]

The block valve 16 is closed again, and a specified pressure $P_H$ is applied through the injection piston 14 to the screw 8. Similar to the operation before injection, the screw 8 makes a balancing movement under the pressure $P_H$. Specifically, the screw 8 moves backward when the dwelling pressure is greater than the pressure $P_H$, or moves forward when the dwelling pressure is smaller than $P_H$, and stops at an equilibrating point or the second stop position. The screw position detector 18 detects the positional value $S_H$ of the screw 8 at the second stop position, and sends it to the controller 13 and the processor 19. The resin temperature detector 21 detects the temperature $T_{H1}$ of the plasticized synthetic resin with the screw 8 at the second stop position, and the screw pushing pressure detector 21 detects the pressure applied to the screw 8 or the resin pressure value $P_{H1}$ determined by the pressure applied to the screw at the second stop position. These data are all sent to the processor 19.

When the positional value $S_I$ or $S_H$ of the screw 8 at the first or second stop position is detected, the screw 8 is in the stationary state after a balancing movement under the specified pressure $P_I$ or $P_H$ applied to the screw 8. Therefore, the check valve 9 at the front end of the screw 8 is closed or kept closed, so that the amount of the resin existing in front of the screw 8 in the cylinder 4, that is, in the space between the nozzle 3 and the front end of the screw 8 is fixed.

Using the PVT relation formula obtained in advance, the processor 19 calculates the specific volume value $V(P_{I1}, T_1)$ of the plasticized synthetic resin with the screw 8 at the first stop position, and the specific volume value $V(P_{H1}, T_1)$ with the screw 8 at the second stop position. Then, the filling weight $G'$ of the resin in the mold cavity 7 or the injection weight G of the resin from the cylinder 4 is obtained through operations using the equation (1)'.

Figure 3:
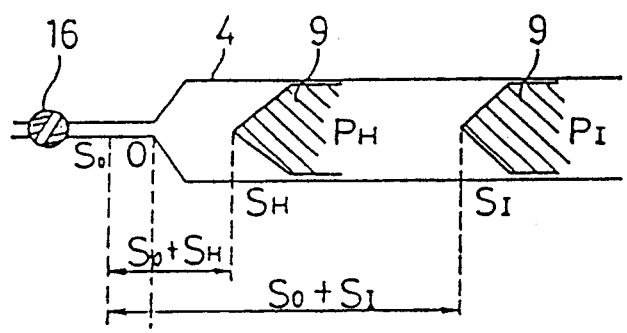

As shown in FIG. 3, the positional values $S_I$ and $S_H$ of the first and second stop positions are determined with the forward limit position of the screw 8 as a reference point, while the plasticized synthetic resin in the space between the front end of the screw 8 and the block valve 16 is compressed by the screw 8 under pressures of $P_I$ and $P_H$. Therefore, the equation for obtaining an accurate injection weight G must take account of the capacity from the front end of the screw 8 at its forward limit position to the block valve 16, as indicated below. Specifically, when the capacity from the front end of the screw 8 at its forward limit position to the block valve 19 is converted to a screw positional value which is assumed to be $S_O$, the injection weight G or filling weight $G'$ is expressed by the equation (2):

$$G(=G')=A\times\{(S_O+S_I)/V(P_{I1}, T_{I1})-(S_O+S_H)/V(P_{H1}, T_1)\} \quad (2)$$

Since the difference in the resin temperature before injection and after injection and dwelling is negligibly small, $T_{I1}$ may be regarded to be equal to $T_{H1}$. Therefore, the equation (2) may be transformed to the equation (2)':

$$G(=G')=A\times\{(S_o+S_I)/V(P_{I1},T_{I1})--(S_o+S_H)/V(P_{H1},T_{I1})\} \quad (2)'$$

Figure 4:
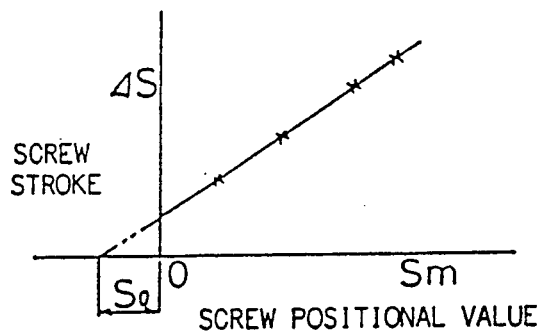

The value of $S_o$ can be obtained easily from the design values of the injection molder. If the design values are not known, the value of $S_o$ can be experimentally obtained in the following procedure:

When a specified pressure is applied to the screw with the resin temperature maintained constant, the screw is moved forward to compress the plasticized synthetic resin in the cylinder. The screw stroke $\Delta S$ in this forward movement is proportional to the resin volume in the cylinder before application of the specified pressure or the positional value $S_m$ of the screw. Therefore, if a linear function for $\Delta S$ and $S_m$ is obtained by varying the resin volume $S_m$ to be compressed, the value of $S_o$ can be determined through extrapolation of a value of $S_m$ for $\Delta S=0$, as shown in FIG. 4.

The filling weight G' obtained from the equation (2) is shown on the display 22 and sent to the comparator 23, which compares the data with the normal filling weight range preset in the monitoring range setter 24 so as to judge whether or not the product has been molded properly. If the value is out of the preset range, the comparator 23 outputs an abnormal signal indicating a defective product.

According to the present embodiment of the invention, the temperature of plasticized synthetic resin is detected for each injection process, and the specific volume value of the resin is obtained at each detected temperature. If fluctuation in the resin temperature is small, the resin temperature may be detected at intervals of a specified number of injection processes. In such a case, the resin temperature detected for certain injection process may be used until the next detection.

According to the embodiment, the filling weight G' of plasticized synthetic resin in the cavity 7 of the mold 1 is obtained to check whether or not moldings are formed normally. If the molding condition changes or is changed from the standard condition, the changed screw stroke value $\Delta S'$ may be obtained from the filling weight G' by using the following equations, and products may be monitored on the basis of the obtained $\Delta S'$.

Assuming that the standard filling weight is $G_o$ and the specific volume value is $V(P_o, T_o)$ under the standard molding condition (resin pressure value at $P_o$ and resin temperature at $T_o$), the following equation (3) holds true for the screw stroke value $\Delta S$:

$$G_o/A = \Delta S/V(P_o, T_o) \qquad (3)$$

The filling weight G' can be substituted for $G_o$ as follows, and the equation can be transformed to the equation (3)':

$$G'/A = \Delta S'/V(P_o, T_o)$$

$$\Delta S' = (G'/A) \times V(P_o, T_o) \qquad (3)'$$

On the basis of the equations (2)' and (3)' for obtaining the filling weight G' for the screw positional value $S_I$ and resin pressure value $P_{I1}$ with the screw at the first stop position, and for the screw positional value $S_H$ and resin pressure value $P_{H1}$ with the screw at the second stop position, the screw stroke value $\Delta S'$ under a molding condition different from the standard can be expressed by the equation (3)'':

$$\Delta S' = V(P_o, T_o)(S_o+S_I)/V(P_{I1}, T_{I1}) - V(P_o, T_o)(-S_o+S_H)/V(P_{H1}, T_{H1}) \qquad (3)''$$

In the equations (3)' and (3)'', the filling weight G' has been converted to the screw stroke value under the standard molding condition (resin pressure value at $P_o$ and resin temperature at $T_o$). For actual molding operation, therefore, the screw stroke value $\Delta S'$ may be obtained from the equation (3)'' for $P_{I1}$, $P_{H1}$, $T_{I1}$ and $T_{H1}$ ($T_{I1} = T_{H1}$).

At a constant temperature of $T_o$, the ratio of an optional pressure value $P_n$ to the pressure value $P_o$ is expressed as a function of the ratio of the specific volume value with $P_n$ to that with $P_o$, as indicated in the following equation (4):

$$f(P_n/P_o) = V(P_n, T_o)/V(P_o, T_o) \qquad (4)$$

In the above equation (4), if $T_o = T_{I1}$, the ratio of the specific volume value with detected pressure value $P_{I1}$ or $P_{H1}$ to that with $P_o$ is expressed by the following equation (4)' or (4)'':

$$V(P_{I1}, T_o)/V(P_o, T_o) = f(P_{I1}/P_o) \qquad (4)'$$

$$V(P_{H1}, T_o)/V(P_o, T_o) = f(P_{H1}/P_o) \qquad (4)''$$

According to these equations (4)' and (4)'', the equation (3)'' can be transformed to the following equation (3)''':

$$\Delta S' = S_o + S_I/f(P_{I1}/P_o) - S_o + S_H/f(P_{H1}/P_o) \qquad (3)'''$$

Using this equation (3)''', it is possible to obtain the screw stroke value $\Delta S'$ for a molding condition different from the standard condition.

The screw stroke value $\Delta S'$ obtained from the equation (3)''' is presented on the display 22, and sent to the comparator 23. To judge whether or not the product has been molded properly, the comparator 23 compares the value with the screw stroke range preset in the monitoring range setter 24; a normal screw stroke value $\Delta S$ plus a certain allowable screw stroke margin is preset as the screw stroke range. If the value is out of the preset range, an abnormal signal is output to indicate a defective product.

According to the present embodiment of the invention, the pressure applied to the screw 8 before injection is different from the one applied after injection and dwelling; $P_I$ before injection and $P_H$ after injection and dwelling. Alternatively, same pressure may be applied before injection and after injection and dwelling.

As a modification of the present embodiment, a shut-off valve may be installed in the resin flow passage to the cavity 7 of the mold 1 instead of the block valve 16 in the flow path 6 of the nozzle 3.

Now, the procedure for obtaining the PVT relation formula is described in the following. Of various PVT relation formulae proposed for plasticized synthetic resin, the Spencer & Gilmore's equation shown below is referred to for explanation.

$$(P+\pi')(V-\omega) = R'T \qquad (5)$$

wherein
P: pressure of plasticized synthetic resin
V: specific volume value of plasticized synthetic resin
T: temperature of plasticized synthetic resin (absolute temperature)
$\pi'$, $\omega$, $R'$: constants peculiar to resin The equation (5) can be transformed to the following equation (5)':

$$V = R'T/(P+\pi') + \omega \qquad (5)'$$

Figure 5:
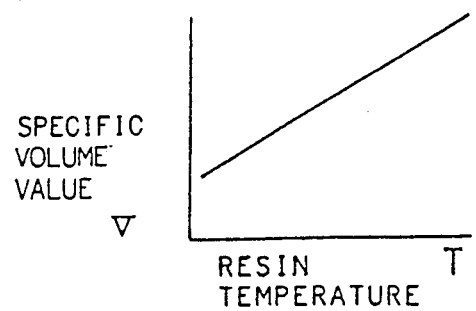

Therefore, under a constant pressure of the plasticized synthetic resin, the specific volume value V of the resin is given in form of a linear function of the temperature T, as indicated in FIG. 5.

As described here, in actual molding operation with an injection molder, the specific volume value V of plasticized synthetic resin is the ratio of the volume V' of the resin injected from the cylinder to the weight G of the injected resin, as expressed by V = V'/G.

By varying the resin temperature T in multiple steps with the resin pressure maintained constant at $P_o$, the value of the constant $\omega$ can be determined from the equation (5)'.

After the value of $\omega$ is determined, the resin pressure P is varied in multiple steps with the resin temperature maintained constant at $T_o$. The varying resin pressure value is assumed to be $P_n$. When the specific volume value of the plasticized synthetic resin at a constant pressure of $P_o$ is expressed as $V(P_o, T_o)$, and that of the resin at a pressure of $P_n$ expressed as $V(P_n, T_o)$, the value of constant $\pi'$ can be determined from the following equation (6):

$$\begin{aligned}
\{V(P_o, T_o) - \omega\}/\{V(P_n, T_o) - \omega\} \quad &(6) \\
= \{R'T_o/(P_o + \pi')\}/\{R'T_o/(P_n + \pi')\} \\
= (P_n + \pi')/(P_o + \pi') \\
= (P_o + \pi' + \Delta P)/(P_o + \pi') \\
= 1 + \Delta P/(P_o + \pi')
\end{aligned}$$

(in which $\Delta P = P_n - P_o$)

When the values of constants $\omega$ and $\pi'$ have been determined, the value of constant $R'$ can also be obtained from the equation (5)'. The PVT relation formula for plasticized synthetic resin can thus be obtained from the Spencer & Gilmore's equation.

Figure 6:
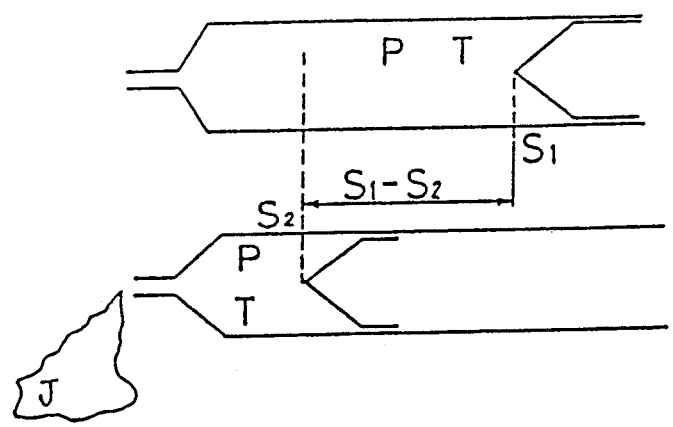

Now, the specific method of obtaining the PVT relation formula with an actual injection molder 2 is explained with reference to FIGS. 1 and 6.

Each of the following operation processes is performed with the resin temperature at T.

i) First process

The block valve 16 is closed, and a specified pressure P is applied by the injection piston 14 to the screw 8 with the block valve 16 in the closed state. Under this pressure P, the screw 8 is moved forward to compress the plasticized synthetic resin in front of the screw 8, makes a balancing movement, and stops at a first stop position where the pressure P equilibrates with the resilience of the compressed plasticized synthetic resin. The screw position detector 18 detects the positional value $S_1$ of the screw 8 at the first stop position, as a value corresponding to the amount of resin contained in the cylinder 4 in front of the screw 8 at the first stop position, and sends the detected value to the processor 19.

ii) Second process

The block valve 16 is closed, and the screw 8 is moved forward. After an appropriate amount of plasticized synthetic resin is injected, the block valve 16 is closed. The weight of the injected resin is measured by a weighing device (not shown), and the measured weight J is input to the processor 19 from the external input device 25.

iii) Third process

The block valve 16 is closed again, and a specified pressure P is applied by the injection piston 14 to the screw 8 in the closed state of the block valve 16. Similar to the operation in the first process, the screw 8 makes a balancing movement and stops at a second stop position under the pressure P. The screw position detector 18 detects the positional value $S_2$ of the screw 8 at the second stop position, as a value corresponding to the amount of resin contained in the cylinder 4 in front of the screw 8 at the second stop position, and sends the value to the processor 19.

The processor 19 performs operations to obtain the specific volume value $V(P, T)$ of the plasticized synthetic resin at temperature T and pressure P, using the following equation (7):

$$\begin{aligned}
V(P, T) &= V'/J \quad &(7) \\
&= A \times (S_2 - S_1)/J
\end{aligned}$$

wherein
V': volume of plasticized synthetic resin injected
A: inside cross sectional area of cylinder By repeating a series of the above-mentioned detections and operations with either of the temperature T or pressure P of plasticized synthetic resin fixed and with the other varied in multiple steps, it is possible to obtain the values of the constants $\pi'$, $\omega$ and $R'$ peculiar to the resin used in the equation (5), through operations. As a result, the PVT relation formula for the resin in question can be obtained.

The PVT relation formula thus obtained is based on the Spencer & Gilmore's equation. The PVT relation formula can also be obtained in other methods such as an experimental analytical method (method of successive approximation with multiple variables).

Potential Industrial Applications of the Invention

The present invention permits highly accurate detection of the weight of plasticized synthetic resin injected to fill in a mold cavity. Therefore, the invention is useful to produce a plurality of moldings of constant quality simultaneously, using a form having a plurality of molding cavities therein.

What is claimed is:

1. A method of detecting the weight of plasticized synthetic resin injected from an injection molder comprising a cylinder with a screw therein for injecting resin to fill a cavity of a mold, the method comprising the steps of:

(a) preliminarily obtaining a formula for the relation between the pressure value and specific volume value of the plasticized synthetic resin, as a characteristic equation for the resin;

(b) providing, between the cylinder and the cavity of the mold, a flow path closing mechanism capable of blocking the flow of plasticized synthetic resin between the cylinder and the cavity;

(c) closing the flow path closing mechanism to block the flow of resin before injecting the resin from the cylinder to fill in the cavity;

(d) applying a specified pressure to the screw with the resin flow blocked, to effect a balancing movement of the screw;

(e) obtaining the positional value of the screw at a first stop position at which the screw stops its balancing movement, and the resin pressure value determined by the pressure applied to the screw at the first stop position;

(f) opening the flow path closing mechanism to allow plasticized synthetic resin to flow from the cylinder to the cavity;

(g) applying pressure to the screw with the flow path closing mechanism open, to inject the resin into the mold cavity;

(h) closing the flow path closing mechanism to block the flow of resin upon completion of injection and dwelling;

(i) applying a specified pressure to the screw with the flow of resin blocked, to effect another balancing movement of the screw;

(j) obtaining the positional value of the screw at a second stop position at which the screw stops its balancing movement, and the resin pressure value determined by the pressure applied to the screw at the second stop position; and (k) obtaining the weight of the resin injected to fill in the mold cavity, on the basis of the formula for relation between resin pressure value and specific volume value as well as the positional values of the screw at the first and second stop positions and the resin pressure values determined by the pressures applied to the screw at the first and second stop positions.

2. A method of detecting the filling weight for an injection molder as described in the claim 1 wherein an abnormality signal is output if the weight of the resin injected to fill in the mold cavity is out of a preset range.

3. A method of detecting the weight of plasticized synthetic resin injected from an injection molder comprising a cylinder with a screw therein for injecting resin to fill a cavity of a mold, the method comprising the steps of:

(a) preliminarily obtaining a formula for the relation between the pressure value, specific volume value, and temperature value, of the plasticized synthetic resin, as a characteristic equation for the resin;

(b) providing, between the cylinder and the cavity of the mold, a flow path closing mechanism capable of blocking the flow of plasticized synthetic resin between the cylinder and the cavity;

(c) closing the flow path closing mechanism to block the flow of resin before injecting the resin from the cylinder to fill in the cavity;

(d) applying a specified pressure to the screw with the resin flow blocked, to effect a balancing movement of the screw;

(e) obtaining the positional value of the screw at a first stop position at which the screw stops its balancing movement, and the resin pressure value determined by the pressure applied to the screw at the first stop position;

(f) opening the flow path closing mechanism to allow plasticized synthetic resin to flow from the cylinder to the cavity;

(g) applying pressure to the screw with the flow path closing mechanism open, to inject the resin into the mold cavity;

(h) closing the flow path closing mechanism to block the flow of resin upon completion of injection and dwelling;

(i) applying a specified pressure to the screw with the flow of resin blocked, to effect another balancing movement of the screw;

(j) obtaining the positional value of the screw at a second stop position at which the screw stops its balancing movement, and the resin pressure value determined by the pressure applied to the screw at the second stop position; and (k) obtaining the weight of the resin injected to fill in the mold cavity, on the basis of the formula for relation between resin pressure value, specific volume value, and temperature value as well as the positional values of the screw at the first and second stop positions and the resin pressure values determined by the pressures applied to the screw at the first and second stop positions.

4. A method of detecting the filling weight for an injection molder as described in claim 3 wherein an abnormality signal is output if the weight of the resin injected to fill in the mold cavity is out of a preset range.

* * * * *